(12) United States Patent
Moran et al.

(10) Patent No.: US 10,249,001 B2
(45) Date of Patent: *Apr. 2, 2019

(54) MANAGEMENT OF GOALS AND RECOMMENDATIONS

(71) Applicant: AMERIPRISE FINANCIAL, INC., Minneapolis, MN (US)

(72) Inventors: William J. Moran, Minnetonka, MN (US); Bryan Charlesworth, Burnsville, MN (US); Stan Jacobson, St. Paul, MN (US); James R. Geppert, St. Paul, MN (US); Marcy Keckler, Edina, MN (US); Bryan Doherty, St. Louis Park, MN (US); Nicolle Reker, Little Canada, MN (US)

(73) Assignee: AMERIPRISE, FINANCIAL, INC., Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/107,611

(22) Filed: Dec. 16, 2013

(65) Prior Publication Data

US 2014/0108298 A1    Apr. 17, 2014

Related U.S. Application Data

(60) Division of application No. 13/439,560, filed on Apr. 4, 2012, now Pat. No. 8,635,142, which is a
(Continued)

(51) Int. Cl.
*G06Q 40/06* (2012.01)
*G06Q 40/00* (2012.01)

(52) U.S. Cl.
CPC ............ *G06Q 40/06* (2013.01); *G06Q 40/00* (2013.01)

(58) Field of Classification Search
CPC ......... G06F 17/30569; G06F 17/30076; G06F 17/30091; G06Q 40/00; G06Q 40/02; G06Q 40/06; G06Q 40/08
See application file for complete search history.

(56) References Cited

U.S. PATENT DOCUMENTS 5,819,263 A    10/1998  Bromley et al.
6,029,153 A *   2/2000  Bauchner ............ G06Q 20/108
                                                    235/379
(Continued)

FOREIGN PATENT DOCUMENTS

CA       2391557 A1 *  5/2001  ............ G06Q 30/02
WO       0031674 A1    6/2000
(Continued)

OTHER PUBLICATIONS

File Maker: Editing Record Access Privileges, Sep. 10, 2005, pp. 1-5.*

(Continued)

*Primary Examiner* — Bijendra K Shrestha
(74) *Attorney, Agent, or Firm* — Toler Law Group, PC

(57) ABSTRACT

A particular method includes creating a financial planning goal for a financial planning client based at least in part on a financial planning objective. A financial planning recommendation is associated with the financial planning goal, and data identifying the financial planning goal and the financial planning recommendation is stored in a data store. The method also includes monitoring activity of the financial planning client and at least one other financial planning client to detect a financial planning trend. In response to the detected trend, a financial planning product is selected for potential incorporation into subsequent recommendation(s).

9 Claims, 11 Drawing Sheets

Related U.S. Application Data continuation of application No. 12/475,260, filed on May 29, 2009, now Pat. No. 8,190,502.

(56) References Cited

U.S. PATENT DOCUMENTS

| | | | | |
|---|---|---|---|---|
| 6,327,611 | B1* | 12/2001 | Everingham | G06Q 10/107 707/999.01 |
| 6,393,412 | B1 | 5/2002 | Deep | |
| 6,430,542 | B1* | 8/2002 | Moran | G06Q 30/02 705/35 |
| 6,763,346 | B1* | 7/2004 | Nishida | G06F 17/30011 707/802 |
| 6,795,071 | B2 | 9/2004 | Tracey et al. | |
| 6,823,077 | B2* | 11/2004 | Dietz | G06K 9/6203 345/156 |
| 6,957,233 | B1* | 10/2005 | Beezer | G06F 17/241 |
| 7,197,484 | B1 | 3/2007 | Yuyama | |
| 7,315,837 | B2 | 1/2008 | Sloan et al. | |
| 7,321,870 | B1 | 1/2008 | Comiskey et al. | |
| 7,363,263 | B1 | 4/2008 | Magaram et al. | |
| 7,383,218 | B1 | 6/2008 | Oros et al. | |
| 7,401,040 | B2 | 7/2008 | Sloan | |
| 7,475,032 | B1 | 1/2009 | Patnode et al. | |
| 7,650,303 | B2* | 1/2010 | Loeper | G06Q 40/00 705/35 |
| 7,774,230 | B2* | 8/2010 | Libman | G06Q 10/10 705/14.1 |
| 7,822,671 | B1* | 10/2010 | Oros | G06Q 40/00 705/36 R |
| 7,823,077 | B2* | 10/2010 | Kurtz | G06F 17/30126 715/771 |
| 7,895,102 | B1* | 2/2011 | Wilks | G06Q 30/06 235/379 |
| 8,190,502 | B2 | 5/2012 | Moran et al. | |
| 2002/0111890 | A1 | 8/2002 | Sloan | |
| 2002/0123949 | A1 | 9/2002 | Vanleeuwen | |
| 2002/0143680 | A1 | 10/2002 | Walters et al. | |
| 2003/0028466 | A1 | 2/2003 | Jenson et al. | |
| 2003/0229529 | A1 | 12/2003 | Mui et al. | |
| 2004/0054610 | A1* | 3/2004 | Amstutz | G06Q 40/02 705/36 R |
| 2004/0133497 | A1* | 7/2004 | Spear | G06Q 40/06 705/36 R |
| 2004/0172320 | A1* | 9/2004 | Spellman | G06Q 10/063114 705/7.15 |
| 2005/0004855 | A1 | 1/2005 | Jenson et al. | |
| 2005/0004856 | A1 | 1/2005 | Brose et al. | |
| 2005/0010510 | A1 | 1/2005 | Brose et al. | |
| 2005/0027632 | A1* | 2/2005 | Zeitoun | G06Q 40/06 705/36 R |
| 2005/0137953 | A1* | 6/2005 | McDonough | G06Q 40/06 705/36 R |
| 2006/0074788 | A1 | 4/2006 | Grizack et al. | |
| 2006/0229917 | A1* | 10/2006 | Simske | G06Q 50/24 705/3 |
| 2006/0241989 | A1* | 10/2006 | Walters | G06Q 30/02 705/312 |
| 2007/0038542 | A1 | 2/2007 | Armstrong et al. | |
| 2008/0281678 | A1* | 11/2008 | Keuls | G06Q 10/06393 705/7.34 |
| 2009/0006124 | A1* | 1/2009 | Sinclair | G06F 21/6245 705/325 |
| 2010/0306126 | A1 | 12/2010 | Moran et al. | |
| 2012/0197818 | A1 | 8/2012 | Moran et al. | |

FOREIGN PATENT DOCUMENTS

| | | | | |
|---|---|---|---|---|
| WO | WO 2007/047588 | * | 4/2007 | G06F 19/00 |
| WO | WO-2007/047588 | * | 4/2007 | G06F 19/00 |
| WO | WO-2007047588 A1 | * | 4/2007 | G06F 19/321 |
| WO | 2010128358 A1 | | 11/2010 | |

OTHER PUBLICATIONS

Microsoft Corporation: Transformation vs. Translation, 2004, p. 1.*

Microsoft Corporation, Transformation v. Translation, 2004, p. 1 (Year: 2004).*

Microsoft Corporation: Transformation vs. Translation, 2004, p. 1. (Year: 2004).*

File Maker: Editing Record Access Privileges, Sep. 10, 2005, pp. 1-5 (Year: 2005).*

The McGraw Hill Companies: Basic Application Software, 2004, 1-48 (Year: 2004).*

Eckerson, W.W. "Predictive Analytics—Extending the Value of Your Data Warehousing Investment"; First Quarter 2007; The Data Warehouse Institute; pp. 1-36.

Thearling, K. "An Introduction to Data Mining—Discovering Hidden Value in Your Data Warehouse"; Jan. 2007; WaybackMachine Archives; pp. 1-8; http://www.thearling.com/text/dmwhite/dmwhite.htm.

IBM: Access Control Based Editor with Finer Granularity, Sep. 21, 2007, Ip.com Prior Art Database Technical Disclosure, pp. 1-9.

The McGraw-Hill Companies, Inc.: Basic Application Software, 2004, pp. 1-48.

* cited by examiner

802

Household (0010007097060): John A. Smith

| Goals | Recommendations |

(Add Goal)  (Show Details >>>)

Goal Summary

| Goal Name | Description | Status | Status Changed |
|---|---|---|---|
| Business: Improve Key Benefits | Improve Key Benefits | Ongoing | 12/16/08 |
| Cash Resrv/Emergency Fund | Provide and Maintain an adeq... | Ongoing | 01/19/08 |
| Death: Johnne | Provide for needs if Johnne d... | Ongoing | 05/08/08 |
| Divorce Analysis | Provide for needs if Johnne is... | Ongoing | 04/25/08 |
| Educ: Johnne | Divorce financial Analysis | Ongoing | 10/22/08 |
| Estate Planning | Provide Education funds for... | Ongoing | 02/28/08 |
| Financial Position | Reduce and pay estate settl... | Ongoing | 07/03/08 |
| Income Tax Johnne A. Miller-Ashcroft | Determine net worth and mon... | Ongoing | 11/02/07 |
|  | Manage income tax for Johnn... | Ongoing | 01/19/08 |
| Investment Planning | Provide asset management | Ongoing | 11/02/07 |
| LTC: Johnne | Provide for long-term case ne... | Ongoing | 05/08/08 |
| MP: Second Home | Provide resources for Second... | Ongoing | 04/29/08 |
| Retirement | Provide for financial independ... | Ongoing | 11/02/07 |

Client View (Goals)

804

Household (0010007097060): John A. Smith

| Goals | Recommendations |

(Add Goal)  (<<<Hide Details)

Goal Summary

| Goal Name | Description | Status | Status Changed |
|---|---|---|---|
| Business: xxx | xxxxxx | Cancelled | 05/20/09 |
| Cash Resrv/Emergency Fund | Provide and Maintain an adeq... | Ongoing | 01/19/08 |
| Death: Johnne | Provide for needs if Johnne d... | Ongoing | 05/08/08 |
| DI: Johnne | Provide for needs if Johnne is... | Ongoing | 04/25/08 |
| Divorce Analysis | Divorce financial Analysis | Ongoing | 10/22/08 |
| Educ: Johnne | Provide Education funds for... | Ongoing | 02/28/08 |

Goal Details

*Indicates required information
Goal Type:    Cash Reserve
Goal Name:   Cash Resrv/Emergency Find
Description*  Provide and maintain an adequate cash reserve
Status*       Ongoing ▽

Date Added 01/19/08
Date Modified 01/19/08
Status Changed 01/19/08
Can NaviPlan analyze? Y (Save) (Reset)

FIG. 8  Client View (Goals – drill down on a particular goal)

— 902

| Household (0010007097060): John A. Smith | | | |
|---|---|---|---|
| Goals \| Recommendations | | | |
| Selected view [All Goal Types ▽]  Show Status of [All Statuses ▽]  (Show Details >>>) | | | |
| Recommendation Summary | | | |
| Goal Name (Status) ⇕ | Recommendation Action ⇕ | Recommendation Status ⇕ | Target Date ⇕ |
| Retirement (Ongoing) | Save $65/monthly into a brok... | Implemented | 12/16/08 |
| Cash Res(v)Emergency | Keep about 1/3 of your cash... | Cancelled | 01/01/09 |
| Death:John A. (Ongoing) | Transfer the cash value from... | Cancelled | 01/01/09 |
| Death:John A. (Ongoing) | Apply for a change in the dea... | Cancelled | 01/01/09 |
| Death:John A. (Ongoing) | Use the flexible death benefit... | Accepted | 01/01/09 |
| Death:John A. (Ongoing) | Change your life insurance... | Cancelled | 01/01/09 |
| Educ:John A. (Ongoing) | Transfer 30% of NQ 3 into... | Cancelled | 01/03/09 |
| Retirement (Ongoing) | Contribute 4% of NQ 2 into... | Cancelled | 01/03/09 |
| Retirement (Ongoing) | Rollover 5% of IRA 1 into... | Cancelled | 01/03/09 |
| Retirement (Ongoing) | Rollover 6% of 457 into IRA... | Rejected | 01/03/09 |

Client View (Recommendations)

904

| Household (0010007097060): John A. Smith | | | |
|---|---|---|---|
| Goals \| Recommendations | | | |
| Selected view [All Goal Types ▽]  Show Status of [All Statuses ▽]  (<<<Hide Details) | | | |
| Goal Summary | | | |
| Goal Name (Status) ⇕ | Recommendation Action ⇕ | Recommendation Status ⇕ | Target Date ⇕ |
| Cash Resrv/Emergency (Ongoing) | Save $18 / once into Acct 1 | Implemented | 01/10/09 |
| Cash Resrv/Emergency (Ongoing) | Save $23 / once to check acct | Proposed | 01/10/09 |
| Cash Resrv/Emergency (Ongoing) | Keep $25,000 as cash rsrv | Proposed | 01/10/09 |

Recommendation Details

Goal Name: Cash Resrve Emergency Fund (Ongoing)  
Date Added 07/10/08  
Date Modified 05/20/09  
Modified By 000080433  
*Indicates required information  
Target Date: [ 01/10/09 ]  
Action: Save $18 once into Acct 1.  
Status: [ Implemented ▽ ]  
Benefit and Comment: A money market deposit account provides...  
(Save) (Reset)

FIG. 9

Client View (Recommendations – drill down on a particular recommendation)

| Goal Type | Disability Income ▽ | ⊘ Recommendation already inserted into the document for this goal |
|---|---|---|
| | | ⚇ Custom benefit |

| Categories<br>Insurance solutions<br>Accumulation solutions<br>Other techniques | ⊘ Title<br>Apply for individual long term DI insurance<br>Apply for group short term DI insurance<br>Apply for group long term DI insurance |
|---|---|
| ┌ Buy new insurance<br>├ Adjust existing insurance<br>└ Drop old insurance | Recommendation Details<br><br>Action<br>Apply for an individual policy of disability income insurance on <<name>> with a monthly benefit of <<$amount>> and an estimated monthly premium of <<$amount>><br><br>Benefit(s)<br>Disability income insurance is a cost effective way to address a disability income need. It replaces part of your earned income if you become disabled... |

— 1002    ⌐ 1004

| Goal Type | Education ▽ | ⊘ Recommendation already inserted into the document for this goal |
|---|---|---|
| | | ⚇ Custom benefit |

| Categories<br>Strategic planning for education funding<br>Accumulation<br>Other techniques | ⊘ Title<br>Begin planning now<br>Calculate education costs and repeat...<br>Qualify for scholarships |
|---|---|
| ┌ Less the 2 years to college<br>├ Between 2 and 10 years...<br>└ Over 10 years until college | Recommendation Details<br><br>Action<br>If college is over 10 years in the future, begin planning now, make projections and take action.<br><br>Benefit(s)<br>Planning for educational costs can be a formidable task. Questions that need to be addressed include: What is the current cost of education today? What adjustment for inflation is reasonable to assume? How can... |

*FIG. 10* ions (e.g., through the use of interfaces configured to communicate and translate between applications and the data manager).

Further details regarding particular embodiments are described in reference to the following figures:

MANAGEMENT OF GOALS AND RECOMMENDATIONS

CROSS-REFERENCE TO RELATED APPLICATIONS

The present application claims priority from and is a divisional patent application of U.S. patent application Ser. No. 13/439,560 filed on Apr. 4, 2012 and entitled "MANAGEMENT OF GOALS AND RECOMMENDATIONS" which is a continuation patent application of, and claims priority from, U.S. patent application Ser. No. 12/475,260 filed on May 29, 2009, now U.S. Pat. No. 8,190,502, each of which is hereby incorporated by reference in its entirety.

BACKGROUND

To achieve personal and financial objectives, individuals often seek a relationship with a financial advisor. Financial advisors typically establish one-to-one relationships with many financial planning clients, regularly consulting with each of the clients to help each client achieve their stated objectives. Financial planners often use computer systems to assist with the financial planning process.

Current financial planning computing systems embed goals and recommendations suggested by a financial planner and accepted by the client in a computer system that the financial planner uses to create the goals and recommendations. However, the embedded goals in a particular computer system may limit the use of more than one analytical tool (e.g. a software financial analysis program on a different computer system), since different analytical tools often have different native data formats. Financial planners often use more than one computer system or computer software program, and each system or program may require the user to input goals and recommendations. In this scenario, a financial planner may need to reconcile the results from using each of the different systems in order to present a summary to their client. In addition, the outputs of the various computer systems may not be easily reconcilable, due to data format differences. Furthermore, many tools create and analyze goals and recommendations based on certain events (e.g., a stock market downturn, an inheritance, or a compensation bonus). The association between the goals and recommendations and particular events may restrict the use of the goals and recommendations in other contexts.

SUMMARY

The present disclosure describes unified storage and management of goals and recommendations (e.g., financial planning goals and financial planning recommendations). The goals and recommendations may be managed by a data manager that provides the ability to create, modify, and use the goals and recommendations with multiple applications at different times and in various contexts. The data manager is compatible with a variety of systems and user applications and enables goals and recommendations to be conveniently managed independent of any particular application, event, or date.

Unified management of goals and recommendations may be achieved via a system that includes a data manager to store and retrieve goals and recommendations to and from a database. The data manager may be accessible from various applications (e.g., through the use of interfaces configured to communicate and translate between applications and the data manager).

Further details regarding particular embodiments are described in reference to the following figures:

BRIEF DESCRIPTION OF THE DRAWINGS

FIG. 8 includes two screenshots of a particular embodiment of a client view interface for a financial planner that displays goals and recommendations;

FIG. 9 includes two additional screenshots of the particular embodiment of the client view interface of FIG. 8;

FIG. 10 includes two screenshots of a goals and recommendations manager interface that includes a hierarchical categorization of goals and recommendations.

DETAILED DESCRIPTION

Figure 1:
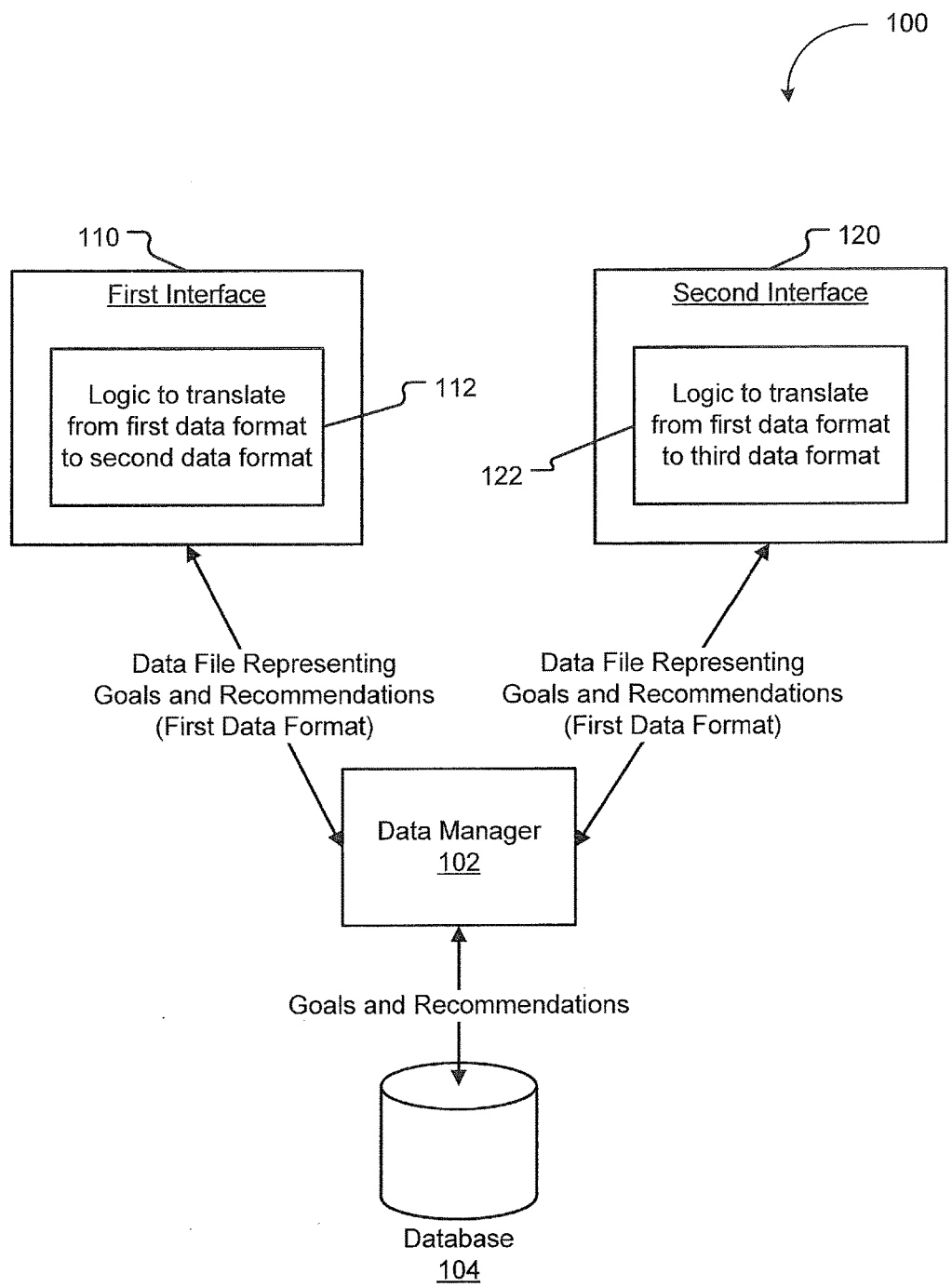
FIG. 1 is a block diagram to illustrate a particular embodiment of a system to manage goals and recommendations.

In a particular embodiment, a method includes identifying a financial planning objective for a financial planning client and creating a financial planning goal for the financial planning client based at least in part on the financial planning objective. The method also includes associating a financial planning recommendation with the financial planning goal, where the financial planning recommendation includes a proposed action to further progress towards the financial planning goal and a recommendation status. The method further includes storing data identifying the financial planning goal and the financial planning recommendation in a data store. The method includes monitoring activity with respect to the financial planning client and at least one other financial planning client and detecting a financial planning trend based on the monitored activity. The method also includes selecting a financial planning product in response to the detected financial planning trend and enabling incorporation of the selected financial planning product into at least one subsequent recommendation.

In another particular embodiment, a non-transitory computer-readable medium includes instructions that, when executed by a computer, cause the computer to receive a financial planning goal associated with a financial planning client, where the financial planning goal identifies a client objective and includes a goal status and one or more goal attributes. The instructions are also executable to cause the computer to receive a financial planning recommendation associated with the financial planning goal, where the financial planning recommendation includes a recommendation status and one or more recommendation attributes. The instructions are further executable to cause the computer to create a record in a database, where the record includes the financial planning goal, the financial planning recommendation, and one or more client attributes of the financial planning client. At least a first portion of the record is not modifiable by at least one application, and at least a second portion of the record is not modifiable by any application and remains constant after the record is created.

In another particular embodiment, a system is disclosed that includes at least one processor and a data manager executable by the at least one processor to store goals and recommendations to records of a database in a first format. The data manager is also executable to retrieve goals and recommendations from records of the database. Each goal stored at the database includes a goal description and an updateable goal status to track progress toward meeting the goal. Each recommendation stored at the database includes a recommendation status and one or more recommendation attributes. The system includes a first interface executable by the at least one processor to receive a record from the data manager and to translate the record from the first data format to a second data format compatible with a first application. The system also includes a second interface executable by the at least one processor to receive the record from the data manager and to translate the record from the first data format to a third data format compatible with a second application. A portion of the record is modifiable by the first application and not modifiable by the second application.

FIG. 1 is a block diagram to illustrate a particular embodiment of a system 100 to manage goals and recommendations. The system 100 includes a data manager 102 communicatively coupled to a database 104. The data manager 102 is also communicatively coupled to a first interface 110 and to a second interface 120. Although not illustrated in FIG. 1, additional interfaces may also be present and communicatively coupled to the data manager 102.

The data manager 102 is configured to store goals and recommendations (e.g., financial planning goals and financial planning recommendations on behalf of a financial planning client) in the database 104. In a particular embodiment, the database 104 is a relational database. For example, a financial planner may identify a financial planning objective for a financial planning client, receive information related to the financial planning objective, create a financial planning goal and a financial planning recommendation based on the receive information, and send the created financial planning goal and the financial planning recommendation to the data manager 102 for storage.

The data manager 102 is also configured to retrieve goals and recommendations from the database 104 and to send a data file representing the retrieved goals and recommendations to one or more interfaces, such as the first interface 110 and the second interface 120. The data file may be represented in a first data format. For example, the data file may be represented in eXtensible Markup Language (XML).

Each goal stored at the database 104 may include an objective and an updateable goal status to track progress towards meeting the objective. The goals may be financial goals and may optionally include non-financial goals. Financial goals include, but are not limited to, financial position goals, retirement goals, education goals, major purchase goals, cash reserve goals, income tax goals, investment planning goals, employee benefits planning goals, survivor income goals, disability income goals, long term care planning goals, healthcare planning goals, property and casualty planning goals, estate planning goals, divorce planning goals, and financial planning goals of a business owner.

For example, when the objective is "retirement" and the particular goal is "retire by age 55," the updateable goal status (e.g., "on track" or "not on track") may indicate progress towards achieving the objective. Each recommendation stored at the database 104 may include a recommendation status and one or more recommendation attributes. For example, the recommendation "invest 5% of each paycheck into 401(k)" may be associated with the "retire by age 55" goal and have a recommendation status such as "accepted" or "rejected," where "5%" and "401(k)" are attributes of the recommendation. It should be noted that recommendations and goals may change in response to external influences, while an associated client objective is maintained. For example, in response to a stock market downturn, a heavily invested client having an objective of "save for retirement" may change a retirement goal from "retire by age 55" to "retire by age 60." Recommendations associated with the retirement goal may also change (e.g., a decreased investment in high-risk high-reward stocks). It should be noted that the client objective of "retirement" did not change.

The first interface 110 and the second interface 120 are each configured to receive data from the data manager 102. In a particular embodiment, the first interface 110 and the second interface 120 are part of a distributed computing system that also includes the data manager 102. The first interface 110 is further configured to translate the received data from the first data format (e.g., XML) to a second data format (e.g., a particular object-oriented class structure) that is compatible with a first application (e.g., a financial planning application, document developer application, or web-based application). The second interface 120 is further configured to translate the received data from the first data format to a third data format that is compatible with a second application (e.g., a financial planning application, a document developer application, or a web-based application). It should be noted that the first application and the second application may be different, and that the system 100 may interface to and interact with additional applications.

In a particular embodiment, the first application and the second application can each modify the goals and recommendations stored in the database 104. For example, when the first application modifies a particular goal or a particular recommendation, the first application may send the modified goal or recommendation to the data manager 102 via the first interface 110. The first interface 110 may translate the modified goal or recommendation from the second data format back to the first data format prior to sending the modified goal or recommendation to the data manager 102. The data manager 102 may store the modified goal or recommendation to the database 104. Alternatively, the data manager 102 may replace a previous version of the goal or recommendation with the modified goal or recommendation.

As another example, when the second application modifies a particular goal or a particular recommendation, the second application may send the modified goal or recommendation to the data manager 102 via the second interface 120. The second interface 120 may translate the modified goal or recommendation from the third data format back to the first data format prior to sending the modified goal or recommendation to the data manager 102. The data manager 102 may then store the modified goal or recommendation to the database 104.

In operation, the data manager 102 may store data records that include goals and recommendations received from the first interface 110 or the second interface 120 at the database 104. When requested, the data manager 102 may also retrieve goals and recommendations from the database 104 and send the retrieved goals and recommendations to the first interface 110 and the second interface 120 via a data file representing the retrieved goals and recommendations. The logic 112 at the first interface 110 and the logic 122 at the second interface 120 may translate the data file into the second data format and the third data format, respectively, before the goals and recommendations are used (e.g., analyzed or displayed at an application).

It will be appreciated that the system 100 of FIG. 1 may provide for centralized storage and tracking of goals and recommendations. The system 100 of FIG. 1 may support the sharing of goals and recommendations between various applications and various contexts.

Figure 2:
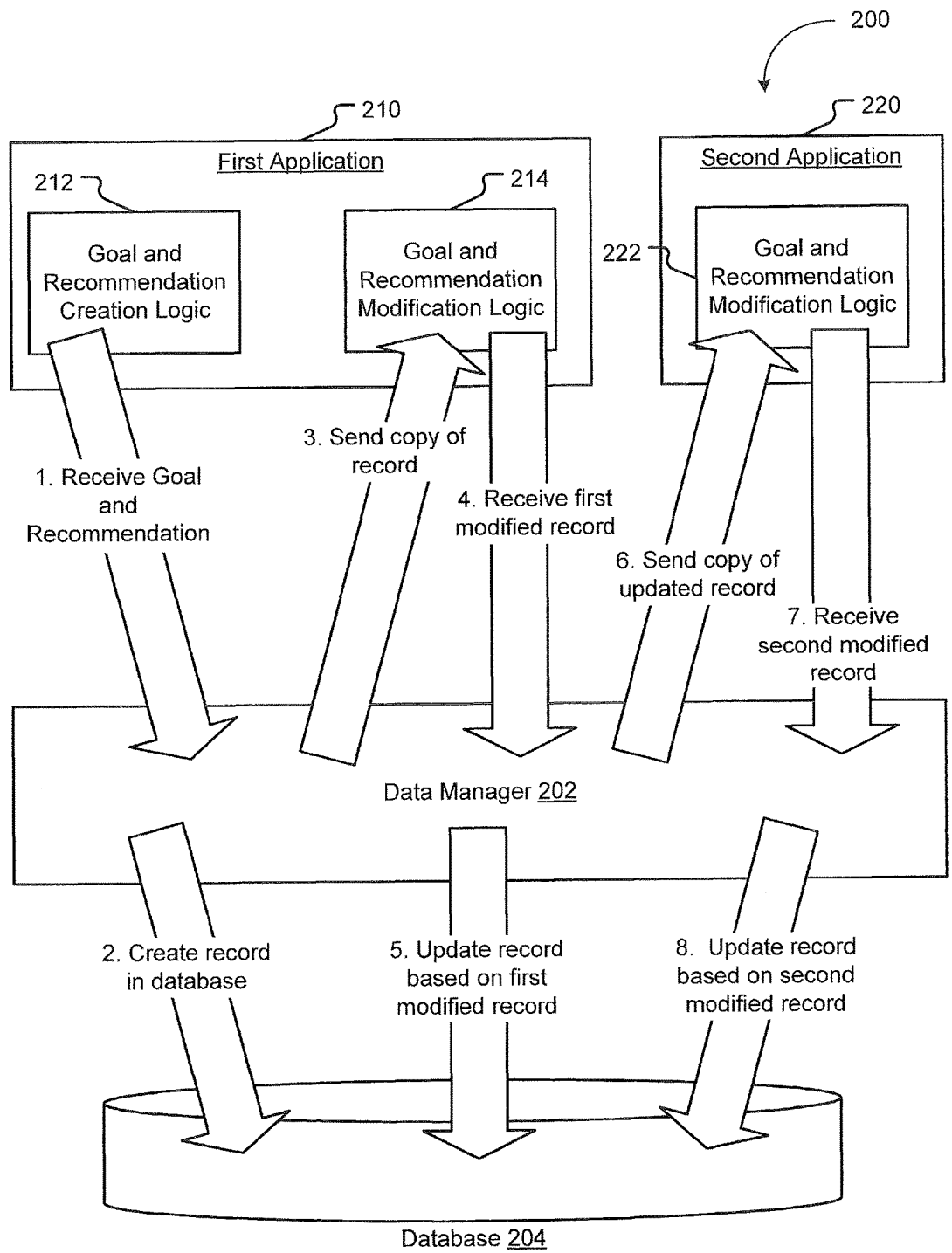
FIG. 2 is a block diagram to illustrate another particular embodiment of a system to manage goals and recommendations.

FIG. 2 is a block diagram to illustrate another particular embodiment of a system 200 to manage goals and recommendations. The system 200 includes a data manager 202 communicatively coupled to a database 204, a first application 210, and a second application 220. In an illustrative embodiment, the data manager 202 is the data manager 102 of FIG. 1, the database 204 is the database 104 of FIG. 1, the first application 210 includes the first interface 110 of FIG. 1, and the second application 220 includes the second interface 120 of FIG. 1. It should be noted that although the following description involves using the system 200 of FIG. 2 in a financial planning context, the system 200 of FIG. 2 may also be used in other advisor-client relationship contexts.

The data manager 202 may be configured to store goals and recommendations (e.g., financial planning goals and financial planning recommendations for a plurality of financial planning clients) in the database 204. The goals and recommendations for a particular client may be stored in a record (e.g., as described herein with respect to the client record 500 of FIG. 5) at the database 204 for the particular client. In a particular embodiment, the database 204 is a relational database. The data manager 202 may also be configured to respond to application requests to retrieve goals and recommendations from the database 204 by generating a copy of a record stored at the database 204 and sending the copy to the requesting application. The data manager 202 may further be configured to receive a modified copy of a record and update the database 204 based on the modified copy of the record.

The first application 210 may include goal and recommendation creation logic 212 configured to create new goals and recommendations and send the new goals and recommendations to the data manager 202. In a particular embodiment, each goal for a client includes a goal status (e.g., ongoing, on track, not on track, deferred, achieved, or cancelled). Each goal may also include one or more goal attributes (e.g., type of goal, description, date added, date modified, date last changed, or a household/client identifier).

Each recommendation may include a proposed action (e.g., transfer, apply for, or save), a recommendation status (e.g., proposed, accepted, implemented, deferred, rejected, or cancelled), and one or more recommendation attributes (e.g., a source financial account identifier, a source financial institution identifier, a destination financial account identifier, a destination financial institution identifier, a suggested monetary amount, a financial services product identifier, an insurance provider identifier, a target completion date, a date created, a date modified, or a benefit statement). It will be appreciated that the proposed action and the recommendation attributes may act as a grammar that can be used by financial planners to generate recommendations for financial planning clients. For example, a recommendation may include "Transfer <suggested monetary amount> from <source financial account> to <destination financial account>," and a financial planner may fill in the <suggest monetary amount>, <source financial account>, and <destination financial account> fields to tailor the recommendation for a particular financial planning client. Other examples of recommendations include "Apply for <financial services product identifier> from <insurance provider identifier>," and "Save <suggest monetary amount> in <destination financial account identifier> by <target completion date>."

The first application 210 may also include goal and recommendation modification logic 214 configured to receive a copy of a record from the data manager 202, modify the copy of the record (e.g., change one or more of a goal status, a goal attribute, a recommendation status, and a recommendation attribute), and send the modified copy of the record to the data manager 202. In a particular embodiment, the first application 210 may translate the copy of the record into a different data format, as described previously with reference to the first interface 110 of FIG. 1.

The second application 220 may include goal and recommendation modification logic 222 configured to receive a copy of a record from the data manager 202, modify the copy of the record (e.g., change one or more of a goal status, a goal attribute, a recommendation status, and a recommendation attribute), and send the modified copy of the record to the data manager 202. In a particular embodiment, the second application 220 may translate the copy of the record into a different data format, as described previously with reference to the second interface 120 of FIG. 1.

In operation, the data manager 202 may receive a newly created goal and a newly created recommendation associated with the goal. For example, the goal and recommendation creation logic 212 at the first application may create a goal, create a recommendation associated with the goal, and send the goal and recommendation to the data manager 202. For example, a goal "have $200,000 saved for daughter's college education" may be created, and a recommendation "deposit $1,000 each month into portfolio" may be associated with the goal. The data manager 202 may also create a record in the database 204 that includes the newly created goal and recommendation.

The data manager 202 may receive a request from a first requesting application (e.g., on a first date) that requests to read or update the previously created goal and recommendation. In response, the data manager 202 may send a copy of the previously created goal and recommendation record to the first requesting application. For example, the data manager 202 may send a copy of the record to the first application 210, where the copy of the record is modified by the goal and recommendation modification logic 214. The data manager 202 may then receive a first modified record from the first application 210, and update the record at the database 204 based on the first modified record, thereby generating an updated record at the database 204. For example, the data manager 202 may update a goal status, a goal attribute, a recommendation status, or a recommendation attribute of the record at the database 204 based on the first modified record received from the first application 210.

The data manager 202 may also receive a request from a second requesting application (e.g., on a second date subsequent to the first date) to read or modify the goal and recommendation. In response, the data manager 202 may send a copy of the updated record to the second requesting application. For example, the data manager 202 may send a copy of the updated record to the second application 220, where the copy of the updated record is modified by the goal and recommendation modification logic 222. The data manager 202 may then receive a second modified record from the second application 220, and update the record at the database 204 based on the second modified record. For example, the data manager 202 may update a goal status, a goal attribute, a recommendation status, or a recommendation attribute of the record at the database 204 based on the second modified copy of the record received from the second application 220.

It will thus be appreciated that the system 200 of FIG. 2 may support the sharing of records (and therefore, goals and recommendations) between various applications. It will also be appreciated that by only allowing the data manager 202, and not individual applications (e.g., the first application 210 or the second application 220) from writing directly to the database 204, the system 200 of FIG. 2 may preserve data integrity, simplify logic at the individual applications, and support compatibility with third-party vendor applications that are created independently of the implementation details of the data manager 202.

Figure 3:
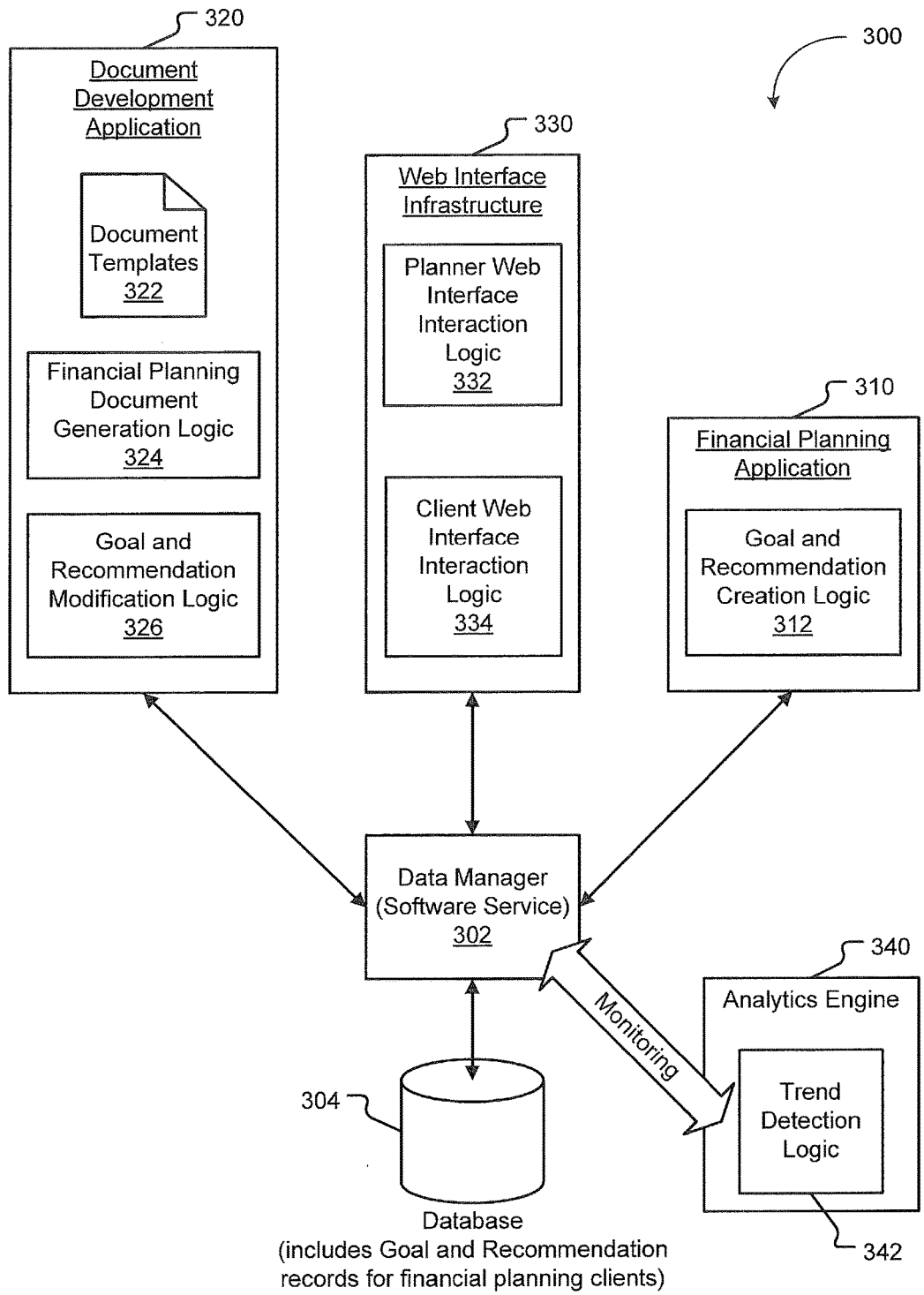
FIG. 3 is a block diagram to illustrate another particular embodiment of a system to manage goals and recommendations in connection with particular illustrative applications.

FIG. 3 is a block diagram to illustrate another particular embodiment of a system 300 to manage goals and recommendations. The system 300 includes a data manager 302 implemented as a software service. The data manager 302 is configured to communicate with a database 304, such as a relational database, that includes goal and recommendation records for financial planning clients. The data manager 302 is accessible by a financial planning application 310, a document development application 320, and a web interface infrastructure 330. The data manager 320 is also accessible by an analytics engine 340 configured to monitor the data manager 320.

The data manager 302 may be configured to store financial planning goals and financial planning recommendations associated with the financial planning goals in the database 304. The data manager 302 may also be configured to retrieve financial planning goals and financial planning recommendations from the database 304, and send a data file representing the retrieved financial planning goals and financial planning recommendations to one or more of the financial planning application 310, the document development application 320, and the web interface infrastructure 330. In a particular embodiment, the data manager 302 communicates with the applications 310-320 and the infrastructure 330 through the use of network communication mechanisms such as XML, Simple Object Access Protocol (SOAP), and HyperText Transfer Protocol (HTTP).

The financial planning application 310 may include goal and recommendation creation logic 312 configured to create new financial planning goals and financial planning recommendations and to send the new financial planning goals and financial planning recommendations to the data manager 302. In a particular embodiment, each financial planning goal for a client includes a goal status and one or more goal attributes, and each financial planning recommendation includes a proposed action, a recommendation status, and one or more recommendation attributes.

The financial planning application 310 may be used by financial planners to create financial planning goals and financial planning recommendations for a financial planning client (e.g., during an initial meeting with the client). The financial planning application 310 may also be used by financial planners to evaluate and update financial planning goals and financial planning recommendations for a financial planning client (e.g., during subsequent meetings with the client).

The document development application 320 may include goal and recommendation modification logic 326 configured to receive financial planning goals and financial planning recommendations from the data manager 302, modify the received financial planning goals and financial planning recommendations (e.g., change one or more of a goal status, a goal attribute, a recommendation status, and a recommendation attribute), and send the modified financial planning goals and financial planning recommendations to the data manager 302.

The document development application 320 may also include financial planning document generation logic 324 configured to create a financial planning document for a financial planning client based on document templates 322 and financial planning goals and financial planning recommendations received from the data manager 302. In a particular embodiment, a user (e.g., a financial planner) selects the particular document template used by the logic 324.

The web interface infrastructure 330 may be configured to support a plurality of web interfaces based on data received from the data manager 302. In a particular embodiment, the web interface infrastructure 330 includes logic 332 to interact with a planner web interface. The planner web interface may include, for a particular financial planner, a display of financial planning goals and financial planning recommendations associated with each client served by the particular financial planner. A display of a particular financial planning goal may include a display of the goal status and goal attributes of the particular goal, and a display of a particular financial planning recommendation may include a display of the recommendation status and recommendation attributes of the particular financial planning recommendation. The planner web interface may identify actions due for a particular financial planning client (e.g., identify that client X has not yet applied for life insurance even though such an action was previously recommended by client X's financial planner). Thus, the planner web interface may allow financial planners to monitor the status of recommendations that the financial planners have proposed (e.g., recommendations with statuses other than "implemented"). The planner web interface may also be useable to respond to inquiries from financial planning clients (e.g., respond to a question about the insurance application process related to the recommendation that client X obtain life insurance by Y date).

In a particular embodiment, the web interface infrastructure 330 includes logic 334 to interact with a client web interface. The client web interface may display, for a particular financial planning client, the goals and recommendations associated with the particular financial planning client. Thus, the client web interface may provide financial planning clients with a convenient method to track their own progress with respect to financial planning goals and recommendations.

The analytics engine 340 may be configured to monitor the creation and modification of financial planning goals and financial planning recommendations by monitoring the data records and data transactions at data manager 302. The analytics engine 340 may include trend detection logic 342 configured to mine monitoring data to detect macro-level trends in the system 300. For example, the trend detection logic 340 may identify trends in financial planning client behavior (e.g., clients are more likely to implement recommendations to invest in bonds than recommendations to invest in stocks), financial planner performance (e.g., a particular financial planner is adept at helping clients achieve education planning goals but not insurance planning goals), and financial planning products (e.g., a particular financial services provider has a higher acceptance rate than another similar financial services provider).

It will be appreciated that financial planning enterprises deploying the system 300 of FIG. 3 may use the trends detected by the analytics engine 340 to improve the level of service provided by the enterprise (e.g., provide financial planners training in certain areas or modify the allocation of financial planning services and products), which may result in improved financial planning customer satisfaction.

Figure 4:
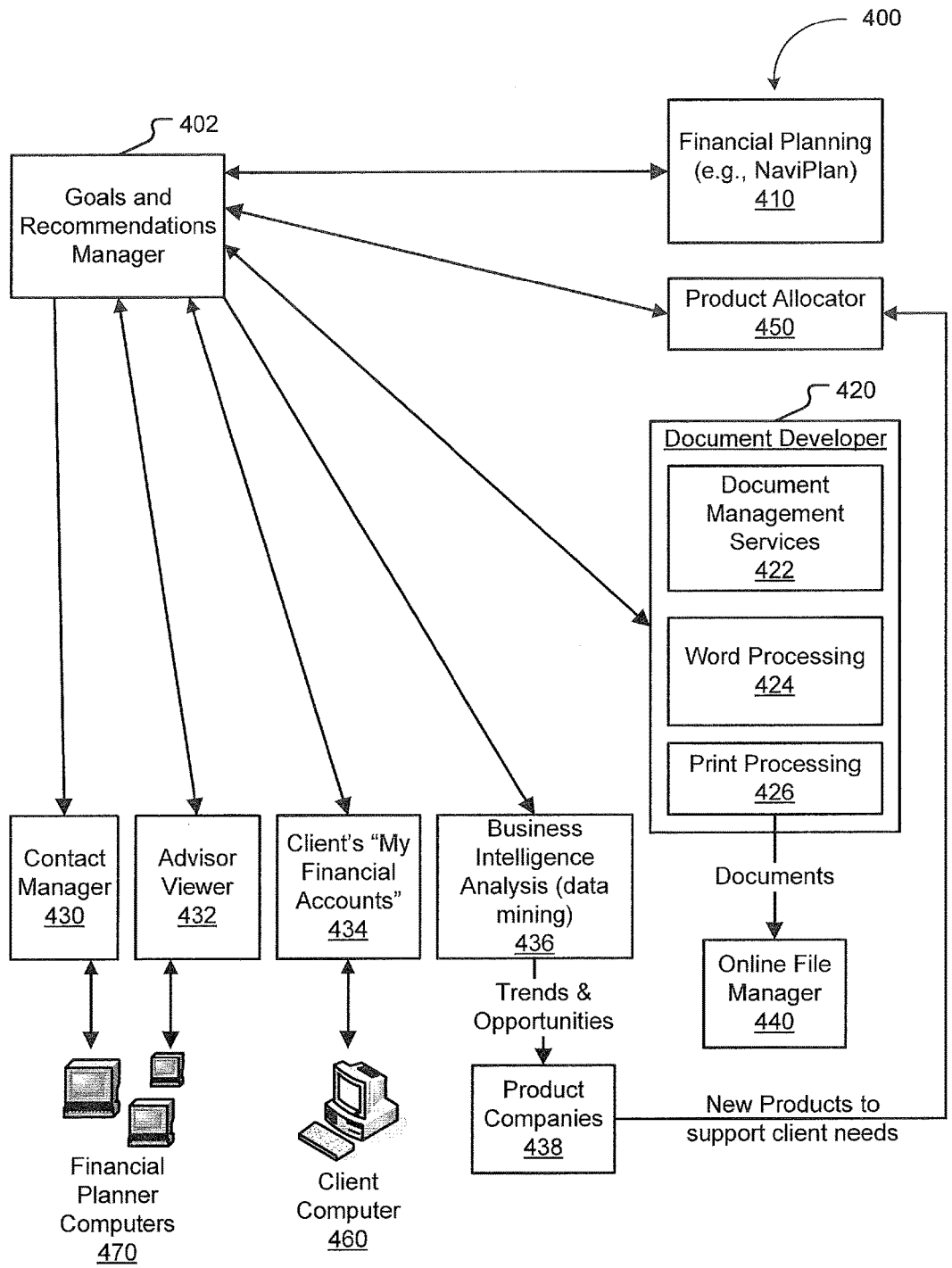
FIG. 4 is a block diagram to illustrate another particular embodiment of a distributed system to manage goals and recommendations in connection with various financial planning applications.

FIG. 4 is a block diagram to illustrate another particular embodiment of a system 400 to manage goals and recommendations. The system 400 may include a goals and recommendations manager 402 communicatively coupled to a plurality of applications and interfaces, such as a financial planning application 410, a document developer 420, a contact manager 430, an advisor viewer 432, a client "my financial accounts" interface 434, a business intelligence analysis engine 436, and a product allocator 450.

The goals and recommendations manager 402 may be configured to store received financial planning goals and financial planning recommendations associated with the financial planning goals (e.g., at a database). The data manager 402 may also be configured to send (e.g., after retrieval from the database) financial planning goals and financial planning recommendations to one or more applications or systems, such as the financial planning application 410, the document developer 420, the contact manager 430, the advisor viewer 432, the client "my financial accounts" interface 434, and the business analysis engine 436.

The financial planning application 410 may be configured to create financial planning goals and financial planning recommendations and send the created financial planning goals and financial planning recommendations to the goals and recommendations manager 402. In a particular embodiment, the financial planning application 410 includes Navi-Plan, a financial planning software application available from Emerging Information Systems, Inc, at Winnipeg, Manitoba, Canada. Alternatively, the financial planning application 410 may be some other software application.

The document developer 420 may include document management services 422, word processing functionality 424, and print processing functionality 426. In a particular embodiment, the document developer 420 includes characteristics of the document developer application 320 of FIG. 3. In another particular embodiment, the document developer 420 includes auto-update on print functionality. That is, when a financial planner uses the document developer 420 to generate a financial planning document for a particular client, the document developer 420 may automatically update the goals and recommendations for the particular client (e.g., by sending the goals and recommendations for the particular client to the goals and recommendations manager 402) when the financial planner prints the financial planning document (e.g., by activating the print processing functionality 426). It will thus be appreciated that the document developer 420 may be used to update goals and recommendations (e.g., via auto-update on print functionality) without having to change existing financial planner workflow.

The document developer 420 may also store financial planning documents at an online file manager 440. In a particular embodiment, the online file manager 420 is accessible by financial planning clients, so that the clients may retrieve their financial planning documents (e.g., from the client's home).

The contact manager interface 430 may be accessible by a plurality of financial planner computers 470 and may include, for each particular financial planner, a listing of financial planning goals that have not been achieved and financial planning recommendations that have not been implemented for clients served by the particular financial planner. The contact manager interface 430 may also include contact information for financial institutions (e.g., banks) and financial services providers (e.g., stock brokers) recommended by the financial planner to the financial planning client.

The advisor viewer interface 432 may be accessible by the financial planner computers 470 and may include, for each particular financial planner, a view of the financial planning goals and financial planning recommendations for each client served by the particular financial planner. The advisor viewer interface 432 may provide the ability to "drill down" and view detailed information for an individual financial planning goal or an individual financial planning recommendation. In a particular embodiment, the advisor viewer interface 432 also provides the user (e.g., the financial planner) the ability to modify existing financial planning goals and financial planning recommendations.

The client "my financial accounts" interface 434 may be accessible by computers located outside a financial planning enterprise (e.g., a financial planning client's client computer 460). The client "my financial accounts" interface may include, for a particular financial planning client, a view of the financial planning goals and financial planning recommendations associated with the particular financial planning client. In a particular embodiment, the interface 434 may provide each particular financial planning client with the ability to input information related to the client's associated financial planning goals and financial planning recommendations (e.g., allow the client to indicate that he or she has implemented a particular recommendation or taken a specific action related to a recommendation). In a particular embodiment, the computers 460 and 470 include desktop and laptop computers with web browsers.

The business intelligence analysis engine 436 may monitor the goals and recommendations manager 402, and may mine the data generated by such monitoring. In a particular embodiment, the business intelligence analysis engine 436 may identify trends and opportunities based on the data mining. The identified trends and opportunities may be used to select new products (e.g., financial services products) from a list of product companies 438. Information regarding these new products may be sent to the product allocator 450, and the product allocator 450 may input the information to the goals and recommendations manager 402, so that the goals and recommendations manager 402 may recommend the new products in the future. Thus, the business intelligence analysis engine 436 may be used to add, remove, or modify the financial services products available in the goals and recommendations manager (and therefore recommended by financial planners) on the basis of high level trends and opportunities determined from evaluating data from the goals and recommendations manager 402.

It will be appreciated the system 400 of FIG. 4 may provide for centralized storage and tracking of goals and recommendations. Thus, the system 400 of FIG. 4 may support the sharing of goals and recommendations between various applications and various contexts.

Figure 5:
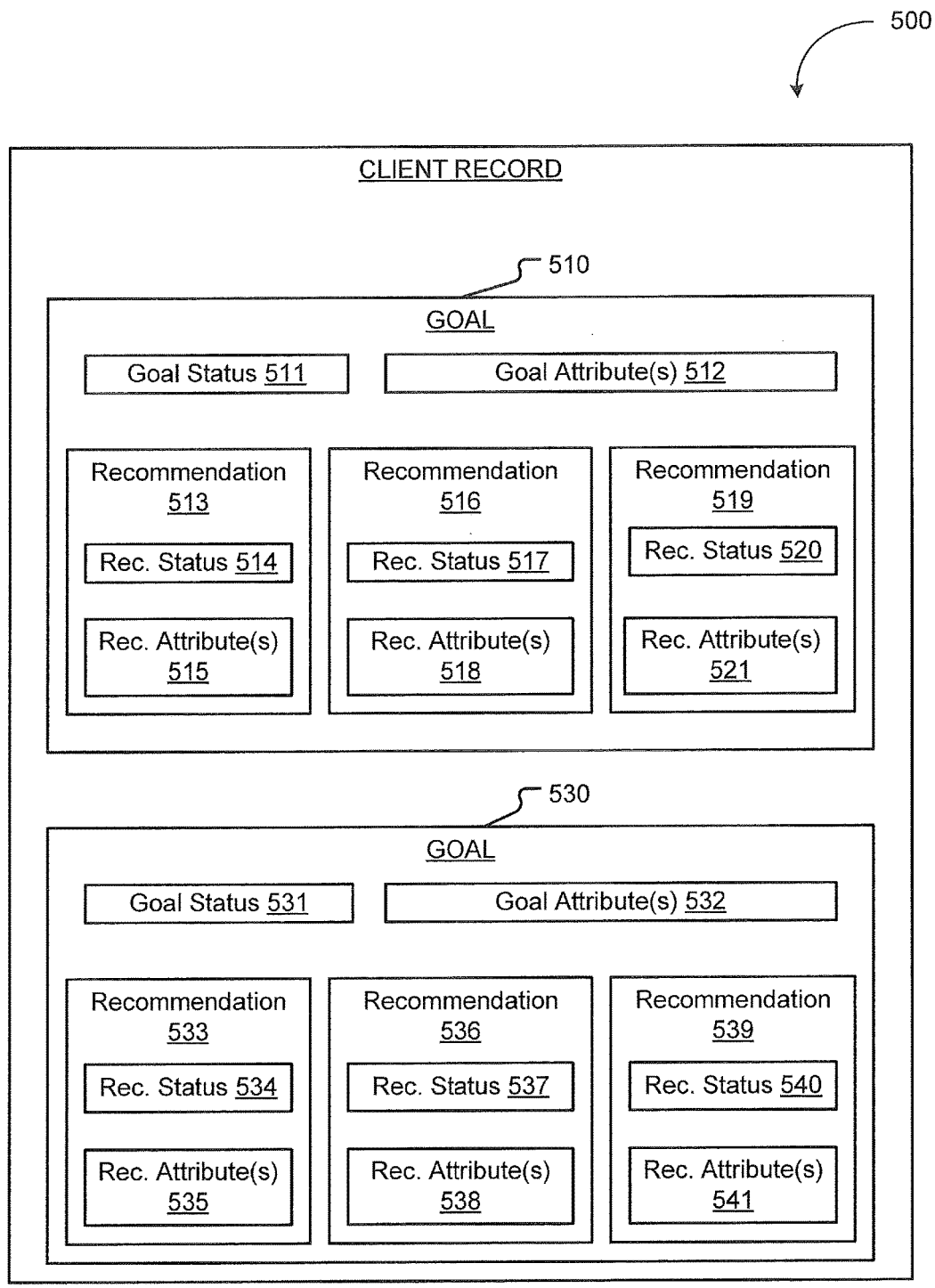
FIG. 5 is a block diagram to illustrate a particular embodiment of a client record that may be stored in the database of FIG. 1, FIG. 2, or FIG. 3 or by the Goals and Recommendations Manager of FIG. 4.

FIG. 5 is a block diagram to illustrate a particular embodiment of a client record 500. In an illustrative embodiment, the client record 500 is stored at the database 104 of FIG. 1, at the database 204 of FIG. 2, at the database 304 of FIG. 3, or by the goals and recommendations manager 402 of FIG. 4.

A client record may include a plurality of goals for a financial planning client. For example, the client record 500 may include a first representative goal 510 and a second representative goal 530. Each goal may include a goal status and one or more goal attributes. For example, the first goal 510 includes the goal status 511 and the goal attribute(s) 512, and the second goal 530 includes the goal status 531 and the goal attribute(s) 532.

Each goal may also be associated with one or more recommendations. In a particular embodiment, the recommendations associated with a particular goal are stored within the particular goal. For example, the first goal 510 includes the recommendations 513, 516, and 519, and the second goal 530 includes the recommendations 533, 536, and 539. Alternatively, the recommendations may be stored separately from the goals, and a goal may include a link or reference to the recommendation(s) associated with the goal.

Each recommendation may include a recommendation status and one or more recommendation attributes. For example, the recommendation 513 includes the recommendation status 514 and the recommendation attribute(s) 515, the recommendation 516 includes the recommendation status 517 and the recommendation attribute(s) 518, and the recommendation 519 includes the recommendation status 520 and the recommendation attribute(s) 521. As another example, the recommendation 533 includes the recommendation status 534 and the recommendation attribute(s) 535, the recommendation 536 includes the recommendation status 537 and the recommendation attribute(s) 538, and the recommendation 539 includes the recommendation status 540 and the recommendation attribute(s) 541.

In a particular embodiment, the client record 500 includes information related to the financial planning client other than the goals and recommendations. For example, the client record 500 may also include information regarding one or more of assets of the financial planning client (e.g., property holdings), liabilities of the financial planning client (e.g., debts), income of the financial planning client (e.g., salary), expenses of the financial planning client (e.g., mortgage payments), investments of the financial planning client (e.g., stock holdings), and family status of the financial planning client (e.g., single, married, and number of dependents). In a particular embodiment, this information is used by financial planners in creating goals and recommendations for the financial planning client that are tailored to help the financial planning client achieve one or more client objectives.

In a particular embodiment, different portions of the client record 500 may be non-modifiable by different applications. That is, the client record 500 may include a portion that is modifiable by a first application but not a second application. The client record 500 may also include constant, immutable portions. That is, the client record 500 may include a portion that is not modifiable by any application after the client record 500 is created.

Figure 6:
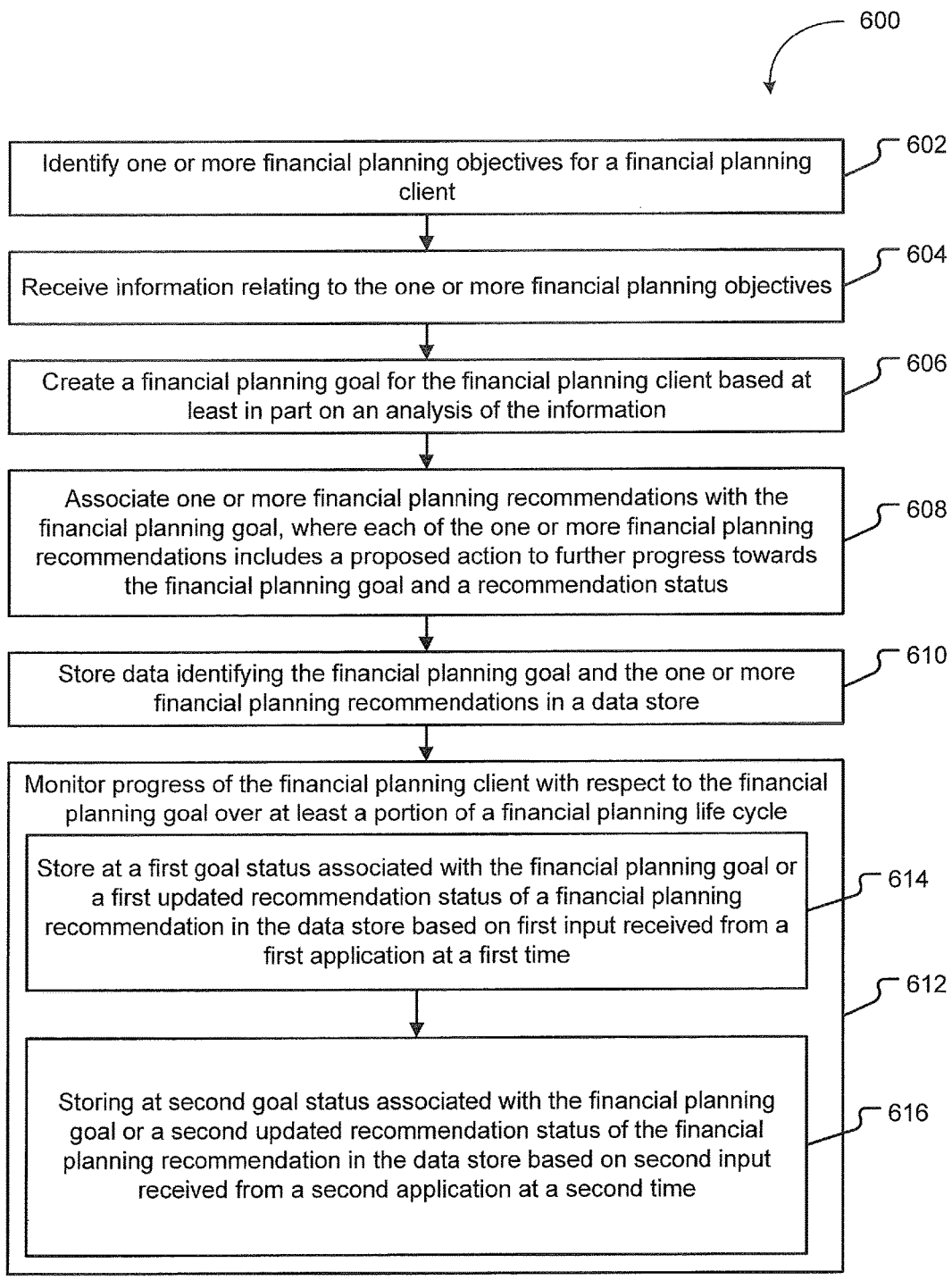
FIG. 6 is a flow diagram to illustrate a particular embodiment of a method of creating and managing goals and recommendations.

FIG. 6 is a flow diagram to illustrate a particular embodiment of a method 600 of managing goals and recommendations. In an illustrative embodiment, the method 600 is performed by the system 100 of FIG. 1, the system 200 of FIG. 2, the system 300 of FIG. 3, or the system 400 of FIG. 4.

The method 600 includes identifying one or more financial planning objectives for a financial planning client, at 602, and receiving information related to the one or more financial planning objectives, at 604. For example, in FIG. 4, a financial planner (e.g., at one of the financial planner computers 470) may identify financial planning objectives and receive information related to the financial planning objects during an initial meeting with a prospective financial planning client.

The method 600 also includes creating a financial planning goal for the financial planning client based at least in part on an analysis of the information, at 606. For example, in FIG. 4, the financial planner may use the financial planning application 410 to analyze the information and create a financial planning goal.

The method 600 further includes associating one or more financial planning recommendations with the financial planning goal, at 608. Each of the one or more financial planning recommendations includes a proposed action to further progress towards the financial planning goal and a recommendation status. For example, in FIG. 4, the financial planner may use the financial planning application 410 to associate the financial planning goal (e.g., "Retire by age 55") with one or more financial planning recommendations (e.g., "Invest the maximum allowed in a Roth IRA every year").

The method 600 includes storing data identifying the financial planning goal and the financial planning recommendations in a data store, at 610. For example, in FIG. 4, the goals and recommendations manager 402 may store data identifying the financial planning goal and the one or more financial planning recommendation. In an illustrative embodiment, the data is stored at a database, such as the database 104 of FIG. 1, the database 204 of FIG. 2, or the database 304 of FIG. 3. In another illustrative embodiment, the data identifying the financial planning goal and the financial planning recommendations is formatted as described herein with reference to the client record 500 of FIG. 5.

The method 600 also includes monitoring progress of the financial planning client with respect to the financial planning goal over at least a portion (e.g., a time period between two financial planning sessions) of a financial planning life cycle, at 612.

The monitoring includes storing a first goal status associated with the financial planning goal or a first updated recommendation status of a financial planning recommendation in the data store based on first input received from a first application at a first time, as shown at 614. For example, in FIG. 4, the goal status of the financial planning goal or a recommendation status of one of the financial planning recommendations may be updated by the goals and recommendations manager 402 based on input received at the client "my financial accounts" interface 436. The monitoring also includes storing a second goal status associated with the financial planning goal or a second updated recommendation status of a financial planning recommendation in the data store based on second input received from a second application at a second time, as shown at 616. The second goal status may be different than the first goal status. For example, in FIG. 4, the goal status of the financial planning goal or the recommendation status of the financial planning recommendation may be updated by the goals and recommendations manager 402 based on input received at the document developer 420 on a second date. The first input or the second input may be received after an interaction with the financial planning client (e.g., from a web interface accessed by the financial planning client), from a financial advisor assigned to the financial planning client (e.g., from a financial planner during a financial planning session), or by a party other than the client and the advisor (e.g., from an insurance company report that indicates that the client has successfully applied for life insurance). In a particular embodiment, the first time corresponds to a first financial planning session and the second time corresponds to a second financial planning session. The first financial planning session may correspond to a first financial event (e.g., a home purchase) and the second financial planning session may correspond to a second financial event (e.g., a new child born into a client's family). A financial planning session may include accessing analytical data related to financial planning goals and recommendations from a plurality of applications.

It should be noted that although the method 600 includes only two updates for the purposes of illustration, the method 600 is not limited to two updates. Instead, the method 600 may include any number of updates.

The method 600 of FIG. 6 may enable the monitoring, sharing, and updating of financial planning goals and recommendations between different applications at different times (e.g., over multiple one-on-one financial planning sessions between a financial planner and a financial planning client during the financial planning life cycle or at other times between financial planning sessions).

Figure 7:
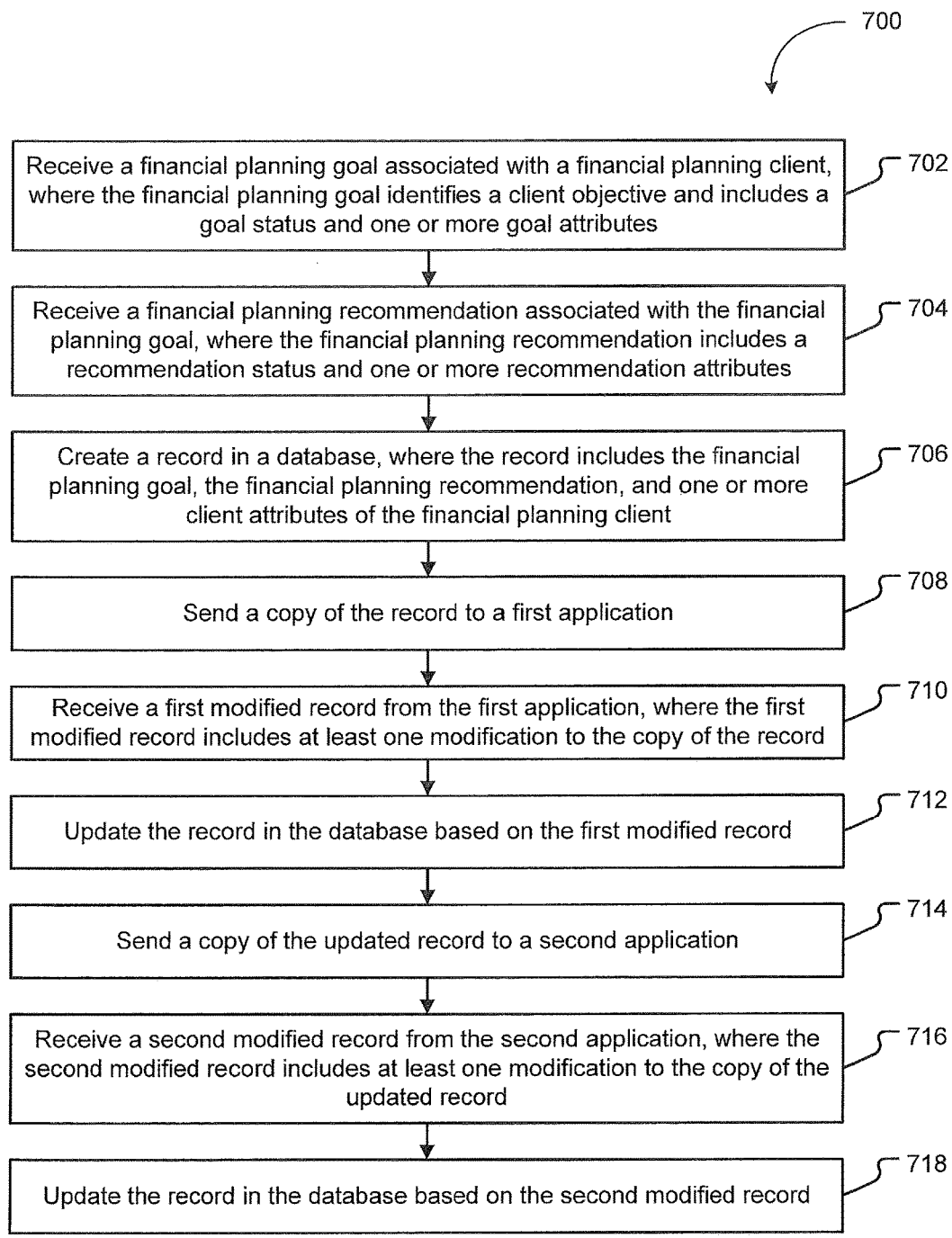
FIG. 7 is a flow diagram of another particular embodiment of a method of creating and managing goals and recommendations.

FIG. 7 is a flow diagram of another particular embodiment of a method 700 of managing goals and recommendations. In an illustrative embodiment, the method 700 is performed by the data manger 102 of FIG. 1, the data manager 202 of FIG. 2, the data manager 302 of FIG. 3, or the goals and recommendations manager 402 of FIG. 4.

The method 700 includes receiving a financial planning goal associated with a financial planning client, where the financial planning goal identifies a client objective and includes a goal status and one or more goal attributes, at 702. For example, in FIG. 2, the data manager 202 may receive a financial planning goal created by the goal and recommendation creation logic 212 at the first application 210.

The method 700 also includes receiving a financial planning recommendation associated with the financial planning goal, where the financial planning recommendation includes a recommendation status and one or more recommendation attributes, at 704. For example, in FIG. 2, the data manager 202 may receive a financial planning recommendation created by the goal and recommendation creation logic 212 at the first application 210.

The method 700 further includes creating a record in a database, where the record includes the financial planning goal, the financial planning recommendation, and one or more client attributes of the financial planning client, at 706. For example, in FIG. 2, the data manger 202 may create a record in the database 204.

The method 700 includes sending a copy of the record to a first application, at 708. For example, in FIG. 2, the data manager 202 may send a copy of the created record to the goal and recommendation modification logic 214 at the first application 210.

The method 700 also includes receiving a first modified record from the first application, where the first modified record includes at least one modification to the copy of the record, at 710. For example, in FIG. 2, the data manager may receive a first modified record from the goal and recommendation modification logic 214 at the first application 210.

The method 700 further includes updating the record in the database based on the first modified record, at 712. For example, in FIG. 2, the data manager 202 may update the record in the database 204 based on the first modified record.

The method 700 includes sending a copy of the updated record to a second application, at 714. For example, in FIG. 2, the data manager 202 may send a copy of the updated record to the goal and recommendation modification logic 222 at the second application 220.

The method 700 also includes receiving a second modified record from the second application, where the second modified record includes at least one modification to the copy of the updated record, at 716. For example, in FIG. 2, the data manager 202 may receive a second modified record from the goal and recommendation modification logic 222 at the second application 220.

The method 700 further includes updating the record in the database based on the second modified record, at 718. For example, in FIG. 2, the data manager 202 may update the record in the database 204 based on the second modified record.

It will be appreciated that the method 700 of FIG. 7 may provide for centralized storage and management of financial planning goals and financial planning recommendations. It will also be appreciated that the method 700 of FIG. 7 may enable the sharing of financial planning goal and financial planning recommendations between multiple applications. It should be noted that although the method 700 of FIG. 7 includes only two updates for the purposes of illustration, the method 700 is not limited to only two updates. Instead, the method 700 of FIG. 7 may include any number of updates.

FIG. 8 depicts two screenshots 802 and 804 of a particular embodiment of a client view interface that displays goals and recommendations. In an illustrative embodiment, the client view interface is supported by the web interface infrastructure 330 of FIG. 3 and is the advisor viewer interface 432 of FIG. 4.

The first screenshot 802 includes a display of financial planning goals for a financial planning client John A. Smith, having household identifier 0010007097060. Each goal also has a displayed description, status, and status changed date. The second screenshot 804 includes a detailed "drill down" display for a particular goal. The detailed display for the particular goal includes further display of a goal type, date added, and date modified. It will be appreciated that the detailed display illustrated in the second screenshot 804 enables modification of a goal description (e.g., via a text box) and a goal status (e.g., via a drop-down menu).

FIG. 9 depicts two additional screenshots 902 and 904 of the particular embodiment of the client view interface of FIG. 8. In an illustrative embodiment, the client view interface is realized using the web interface infrastructure 330 of FIG. 3 and is the advisor viewer interface 432 of FIG. 4.

The first screenshot 902 includes a display of financial planning recommendations for planning client John A.

Smith, having household identifier 0010007097060. Each recommendation has a displayed goal name, a goal status, a recommendation action, a recommendation status, and a target date. The second screenshot 904 includes a detailed "drill down" display for a particular recommendation. The detailed display for each particular recommendation includes further display of a benefit and comment statement, a date added, a date modified, and data identifying the financial planner who last modified the particular recommendation. It will be appreciated that the detailed display illustrated in the second screenshot 904 enables the modification of a target date (e.g., via a text box) and a recommendation status (e.g., via a drop-down menu).

In a particular embodiment, a goals and recommendations manager (e.g., the goals and recommendations manager 402 of FIG. 4) maintains a hierarchical list of goals and associated recommendations. In such an embodiment, creating a new recommendation includes accessing an interface (e.g., a web interface or an interface accessible from an application, such as the financial planning application 410 of FIG. 4 or the document developer application 420 of FIG. 4) provided by the goals and recommendations manager to select the desired new recommendation. For example, the interface may include the interface as described herein with reference to FIG. 10.

In a particular embodiment, a first level of a hierarchy includes goal categories (e.g., protection goals, accumulation goals, tax goals, financial position goals, employee benefit goals, health care goals, and property and casualty goals).

A second level of the hierarchy may include particular goal types. For example, protection goals may include survivor income goals, disability income goals, and long-term care goals. Accumulation goals may include retirement planning goals, educational planning goals, major purchase goals, cash reserve goals, and investment goals. Tax goals may include income tax and estate tax goals. Financial position goals may include cash flow goals and net worth goals.

A third level of the hierarchy may include a prioritized list of recommendation categories. For example, in the case of protection goals such as survivor income, disability income, and long-term care, high priority recommendations may be insurance solution categories, such as "buy new insurance," "apply for supplemental insurance," "use existing insurance," and "drop existing insurance." Medium priority recommendations may be accumulation categories such as "open new fund" and "use existing fund." Low priority recommendations may include other techniques such as "open a supplemental account."

As another example, in the case of accumulation goals such as retirement, education, major purchase, case reserve, and investment, high priority recommendations may include accumulation categories such as "save," "transfer," and "improve rate of return." Low priority recommendations may include other techniques such as "change amount/timing," "transition to retirement," and "borrow." The education planning accumulation goal may have highest priority recommendations in a strategic planning category such as "<2 years to college," "2-10 years to college," and ">10 years to college." The investment planning accumulation goal may have highest priority recommendations in a general strategy category, such as "general advice," "professional management," and "repositioning." The retirement planning accumulation goal may have lowest priority recommendations in a distribution category such as "liquidation order," "retirement plans," "regular taxable," "annuities," "non-qualifying assets," "life insurance," "investment real estate," "business," and "home."

As another example, the "income tax" tax planning goal may prioritize recommendations for a plurality of areas (e.g., wealth, retirement, education, health care, life insurance, disability insurance, long-term care, and employee benefits) based on desirability. That is, tax-free recommendations may be the highest priority recommendations and tax deductions may be the lowest priority recommendation. In a particular embodiment, the categories may include (in decreasing order of priority): tax-free (e.g., municipal bonds, t-bills, Roth IRA, health insurance, $50,000 group term life insurance, employee cafeteria plan), tax rate changing (e.g., capital gains & losses, and custodial accounts), tax deferring (e.g., US Savings Bonds, annuities, and employee stock options), tax credits (e.g., low income housing, foreign tax, hope & lifetime learning credits), and tax deductions (e.g., mortgage and home equity loans, traditional IRAs, college student loan interest, medical expenses, and employee job expenses).

FIG. 10 depicts two screenshots 1002 and 1004 of a goals and recommendations manager interface that includes a hierarchical categorization of goals and recommendations. The hierarchy in the first screenshot 1002, in order of broadest to narrowest, is "disability income goals," "insurance solutions," and "buy new insurance." The recommendation details for the selected recommendation "apply for individual long term DI insurance" may include an action and a benefit statement, as illustrated in the first screenshot 1002.

The hierarchy in the second screenshot 1004, in order of broadest to narrowest, is "education goals," "strategic planning for education funding," and "over 10 years until college." The recommendation details for the selected recommendation "begin planning now" may include an action and a benefit statement, as illustrated in the second screenshot 1004.

It will thus be appreciated that a goals and recommendations manager interface, such as the interface depicted by the screenshots 1002 and 1004 of FIG. 10, may be used by financial planners to categorize, locate, and assign goals and recommendations to clients.

In a particular embodiment, a computer-readable medium is disclosed that includes instructions, that when executed by a computer, cause the computer to receiving a financial planning goal associated with a financial planning client. The financial planning goal identifies a client objective and includes a goal status and one or more goal attributes. The computer-readable medium also includes instructions, that when executed by the computer, cause the computer to receive a financial planning recommendation associated with the financial planning goal. The financial planning recommendation includes a recommendation status and one or more recommendation attributes. The computer-readable medium also includes instructions, that when executed by the computer, cause the computer to create a record in a relational database, where the record includes the financial planning goal, the financial planning recommendation, and one or more client attributes of the financial planning client. The computer-readable medium includes instructions, that when executed by the computer, cause the computer to send a copy of the record to a first application, receive a first modified record from the first application, and update the record in the relational database based on the first modified record. The first modified record includes at least one modification to the copy of the record. The computer-readable medium also includes instructions, that when executed by the computer, cause the computer to send a copy of the updated record to a second application, receive a second modified record from the second application, and update the record in the relational database based on the second modified record. The second modified record includes at least one modification to the copy of the updated record.

The computer may include a data manager, such as the data manager 102 of FIG. 1, the data manager 202 of FIG. 2, the data manager 302 of FIG. 3, or the goals and recommendations manager 402 of FIG. 4. The computer may also interface (e.g., via the interfaces 110-120 of FIG. 1) with a plurality of applications, such as the applications 210-220 of FIG. 2, the applications 310-340 of FIG. 3, and the applications 410, 420, 430-438, and 450 of FIG. 4. The computer may also store and retrieve data to and from a database, such as the database 104 of FIG. 1, the database 204 of FIG. 2, or the database 304 of FIG. 3.

Figure 11:
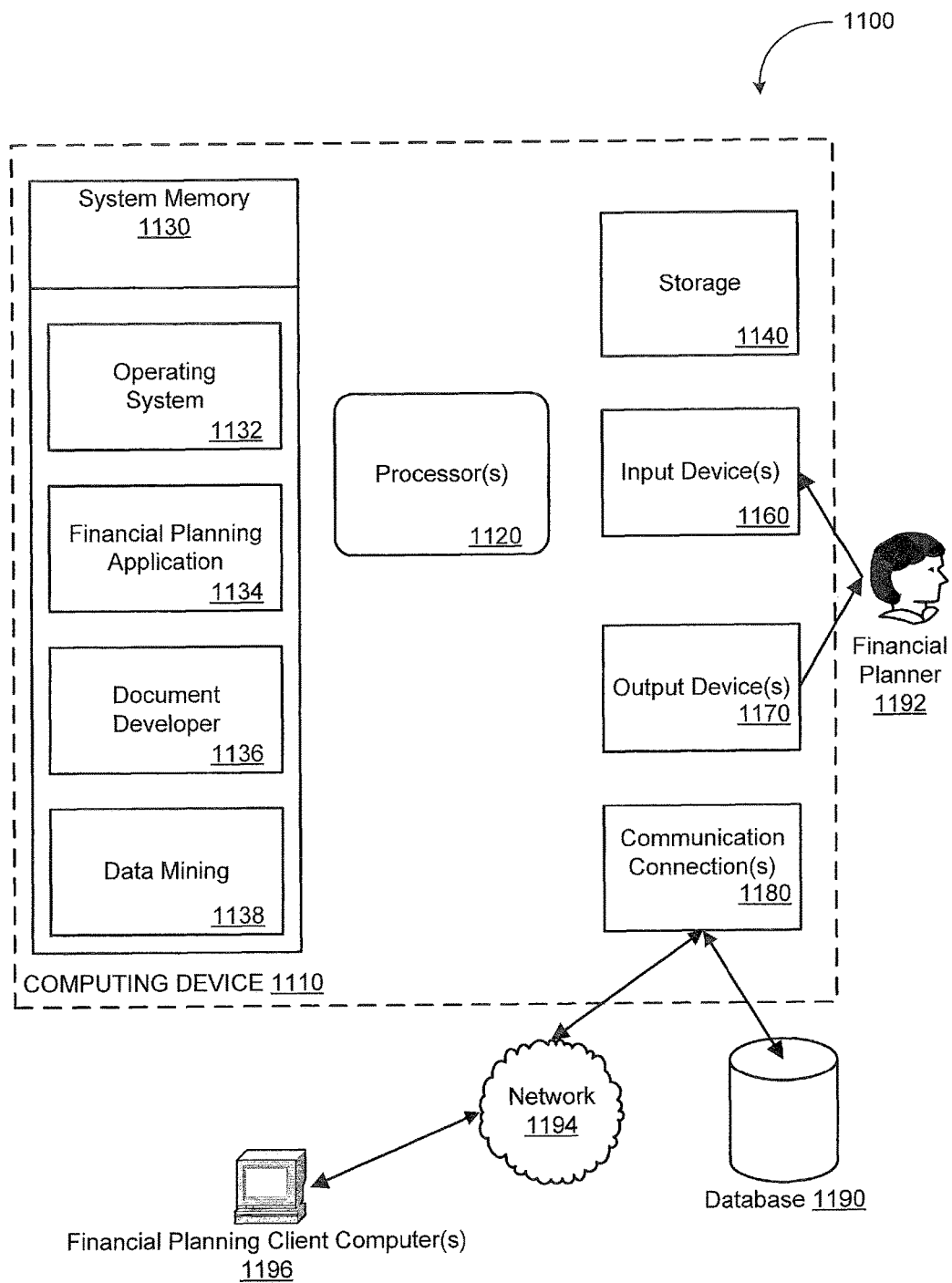
FIG. 11 is a block diagram of a computing environment including a computing device operable to support embodiments of computer-implemented methods, computer program products, and system components as illustrated in FIGS. 1-10.

FIG. 11 shows a block diagram of a computing environment 1100 including a representative computing device 1110 operable to support embodiments of computer-implemented methods, computer program products, and system components according to the present disclosure. In an illustrative embodiment, the computing device 1110 may implement one or more of the components of the system 100 of FIG. 1, the system 200 of FIG. 2, the system 300 of FIG. 3, or the system 400 of FIG. 4.

The computing device 1110 includes at least one processor 1120 and system memory 1130. Depending on the configuration and type of computing device, the system memory 1130 may be volatile (such as random access memory or "RAM"), non-volatile (such as read-only memory or "ROM," flash memory, and similar memory devices that maintain stored data even when power is not provided) or some combination of the two. The system memory 1130 typically includes an operating system 1132 and one or more applications. For example, the system memory 1130 may include one or more of a financial planning application 1132, a document developer application 1136, and a data mining application 1138. In an illustrative embodiment, the financial planning application includes the financial planning application 310 of FIG. 3 or the financial planning application 410 of FIG. 4, the document developer application 1136 includes the document development application 320 of FIG. 3 or the document developer 420 of FIG. 4, and the data mining application 1138 includes the analytic engine 340 of FIG. 3 or the business analysis engine 436 of FIG. 4. Alternatively, the applications may be located at multiple computing devices, where the multiple computing devices are part of a distributed computing system. In this case, one or more of the multiple computing devices of the distributed system may comprise the representative computing device 1110.

The computing device 1110 may also have additional features or functionality. For example, the computing device 110 may also include removable and/or non-removable data storage devices such as magnetic disks, optical disks, tape, and standard-sized or miniature flash memory cards. Such additional storage is illustrated in FIG. 11 by storage 1140. Computer storage media may include volatile and/or non-volatile storage and removable and/or non-removable media implemented in any method or technology for storage of information such as computer-readable instructions, data structures, program components or other data. The system memory 1130 and the storage 1140 are examples of computer storage media. The computer storage media includes, but is not limited to, RAM, ROM, electrically erasable programmable read-only memory (EEPROM), flash memory or other memory technology, compact disks (CD), digital versatile disks (DVD) or other optical storage, magnetic cassettes, magnetic tape, magnetic disk storage or other magnetic storage devices, or any other medium that can be used to store information and that can be accessed by computing device 1110. Any such computer storage media may be part of the computing device 1110. The computing device 1110 may also have input device(s) 1160, such as a keyboard, mouse, pen, voice input device, touch input device, etc. When the computing device 1110 is a financial planner computer (e.g., one of the financial planner computers 470 of FIG. 4), the input device(s) 1160 may be used by a financial planner 1192 to communicate with the computing device 1110. Output device(s) 1170, such as a display, speakers, a printer, etc. may also be included.

The computing device 1110 also contains one or more communication connections 1180 that allow the computing device 1110 to communicate with a database 1190 and financial planning client computer(s) 1196 via a wired or a wireless network 1194. In an illustrative embodiment, the database 1190 is the database 104 of FIG. 1, the database 204 of FIG. 2, or the database 304 of FIG. 3. In another illustrative embodiment, the financial planning client computer(s) 1196 connect to the computing device 1110 via a web interface, such as the client "my financial accounts" interface 434 of FIG. 4.

The communication connections 1180 are an example of communication media. By way of example, and not limitation, communication media may include wired media such as a wired network or direct-wired connection, and wireless media, such as acoustic, radio frequency (RF), infrared and other wireless media. It will be appreciated, however, that not all of the components or devices illustrated in FIG. 11 or otherwise described in the previous paragraphs are necessary to support embodiments as herein described. For example, the output device(s) 1170 may be optional.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

Those of skill would further appreciate that the various illustrative logical blocks, configurations, modules, and process or instruction steps described in connection with the embodiments disclosed herein may be implemented as electronic hardware, computer software, or combinations of both. Various illustrative components, blocks, configurations, modules, or steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method described in connection with the embodiments disclosed herein may be embodied directly in hardware, in a software module executed by a processor, or in a combination of the two. A software module may reside in computer readable media, such as random access memory (RAM), flash memory, read only memory (ROM), registers, a hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor or the processor and the storage medium may reside as discrete components in a computing device or computer system.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments.

The previous description of the embodiments is provided to enable a person skilled in the art to make or use the embodiments. Various modifications to these embodiments will be readily apparent to those skilled in the art, and the generic principles defined herein may be applied to other embodiments without departing from the scope of the disclosure. Thus, the present invention is not intended to be limited to the embodiments shown herein but is to be accorded the widest scope possible consistent with the principles and novel features as defined by the following claims, and their equivalents.

What is claimed is:

1. A method of storing and retrieving data in a computing environment having a plurality of processors and a memory, the method comprising:

configuring the memory according to a database including a plurality of records, each record including a plurality of portions;

storing, by a data manager executed by at least one processor, a first record in the database, the first record identifying a goal and a recommendation and having a first format, the first record accessible to a first application and to a second application, wherein a first portion of the first record is modifiable by the first application and the second application, wherein a second portion of the first record is modifiable by the first application but not the second application, wherein a third portion of the first record is not modifiable by any application and remains constant after the first record is created, wherein the data manager has direct write access to the database, and wherein the first application and the second application do not have direct write access to the database;

translating the first record into a second record, wherein the second record has a second format compatible with the first application;

receiving a first modified record from the first application based on the second record, wherein the first modified record includes at least one modification to at least one of the first portion or the second portion;

generating an updated record, wherein the updated record is generated by updating the first record stored in the database based on the first modified record;

translating the updated record into a third record, wherein the third record has a third format compatible with the second application;

receiving a second modified record from the second application based on the third record, wherein the second modified record includes at least one modification to the first portion;

generating a twice-updated record, wherein the twice-updated record is generated by updating the updated record stored in the database based on the second modified record; and storing the twice-updated record in the database.

2. The method of claim 1, further comprising storing, in the twice-updated record of the database, a first goal status and a first updated recommendation status in response to receiving first input from the second application.

3. The method of claim 2, wherein the first goal status is one of an ongoing status, an on track status, a not on track status, a deferred status, an achieved status, or a cancelled status.

4. The method of claim 2, further comprising storing, in the twice-updated record of the database, a second goal status and a second updated recommendation status in response to receiving second input from the second application.

5. The method of claim 4, wherein the second goal status is different than the first goal status.

6. The method of claim 4, wherein at least one of the first application or the second application is a financial planning application.

7. The method of claim 4, wherein at least one of the first application or the second application is a document development application.

8. The method of claim 4, wherein at least one of the first application or the second application is a web application.

9. A server-driven database management system for providing database access to format-incompatible applications residing on remote computers, the server-driven database management system comprising:

a first computer comprising at least a first processor and a first application executable by the first processor, wherein the first application is incompatible with records represented in a first format, wherein the first application is compatible with records represented in a second format, and wherein the first application is configured to translate records to the second format compatible with the first application;

a second computer comprising at least a second processor and a second application executable by the second processor, wherein the second application is incompatible with records represented in the first format, wherein the second application is compatible with records represented in a third format, and wherein the second application is configured to translate records to the third format compatible with the second application; and a server communicatively connected to the first and second computers over a network, the server comprising at least a third processor, a database, and a memory storing a data manager compatible with records represented in the first format, the data manager comprising instructions that when executed by the third processor cause the third processor to:

receive, from the first computer, a goal and a recommendation;

store a first record identifying the goal and the recommendation in the database, the first record having the first format and accessible to the first application and to the second application, wherein a first portion of the first record is modifiable by the first application and the second application, wherein a second portion of the first record is modifiable by the first application but not the second application, wherein a third portion of the first record is not modifiable by any application and remains constant after the record is created, wherein the data manager has direct write access to the database, and wherein the first application and the second application do not have direct write access to the database;

initiate transmission of the first record to the first computer;

receive a first modified record from the first computer, the first modified record based on modifications to the first record made by the first application, wherein the first modified record includes at least one modification to at least one of the first portion or the second portion;

generate an updated record, wherein the updated record is generated by updating the first record stored in the database based on the first modified record;

initiate transmission of the updated record to the second computer;

receive a second modified record from the second computer, the second modified record based on modifications to the updated record made by the second application, wherein the second modified record includes at least one modification to the first portion;

generate a twice-updated record, wherein the twice-updated record is generated by updating the updated record stored in the database based on the second modified record; and store the twice-updated record in the database.

* * * * *